Jan. 17, 1961

L. DEVOL 2,968,756

MOTOR

Filed Oct. 30, 1958

INVENTOR
Lee Devol

BY Diggins & Le Blanc
ATTORNEYS

United States Patent Office 2,968,756
Patented Jan. 17, 1961

2,968,756

MOTOR

Lee Devol, Dayton, Ohio, assignor to The Hamilton Watch Company, Lancaster, Pa., a corporation of Pennsylvania Filed Oct. 30, 1958, Ser. No. 770,855

10 Claims. (Cl. 318—254)

This invention relates to motors and more particularly relates to a motor having a high accuracy of speed control for timekeeping purposes.

Where watches and clocks or other timekeeping devices have been operated from direct current sources in the past, it has been conventional to either utilize a spring-driven mechanism periodically wound by a motor driven by the direct current source, as in an automobile clock, or to utilize some type of oscillatory mechanism which produces an oscillating motion translated to a rotating motion for the purpose of driving the train of a timekeeper, as shown in assignee's Koehler Patent No. 2,662,366. The automobile clock-type of arrangement is difficult to control so as to provide accurate timekeeping while the oscillatory arrangement necessitates some transmission device for translating the oscillatory motion to rotating motion in a single direction.

According to the present invention, there is provided an impulse motor whose speed is controlled by a magnetically driven mechanical vibrator so as to provide timekeeping accuracy which is limited only by the accuracy inherent in the vibrator. Since vibrating reeds and similar mechanical vibrators are capable of extremely high accuracy, the timekeeper itself is capable of providing a very accurate indication of time.

It is accordingly a primary object of the present invention to provide a motor for driving a timepiece wherein the speed of the motor is accurately controlled by means of a mechanical vibrator.

It is another object of the invention to provide a motor for driving a timekeeping device wherein the motor is a direct current impulse motor controlled by a mechanical vibrator and the entire arrangement is so constructed as to utilize a minimum of parts and to provide economy in construction.

It is another object of the invention to provide a motor having its speed accurately controlled by means of a mechanical vibrator operating in conjunction with radiation sensing devices for both powering the motor and controlling its speed.

Figure 1:
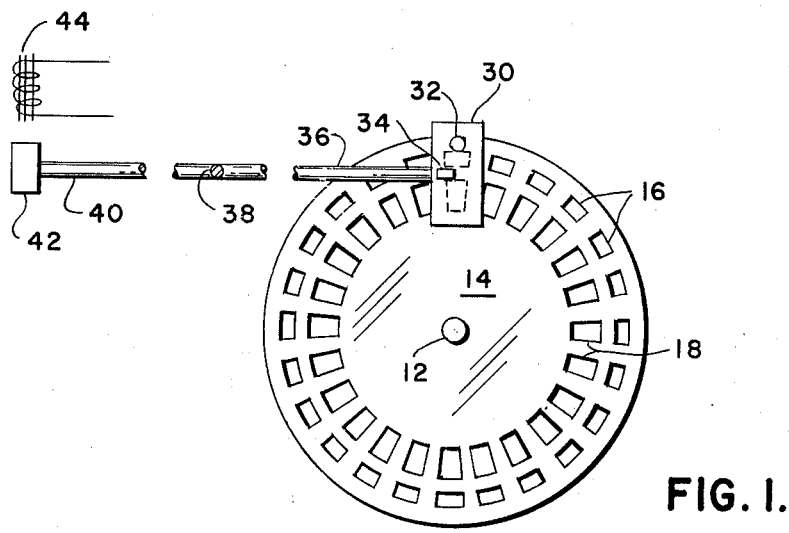
Figure 2:
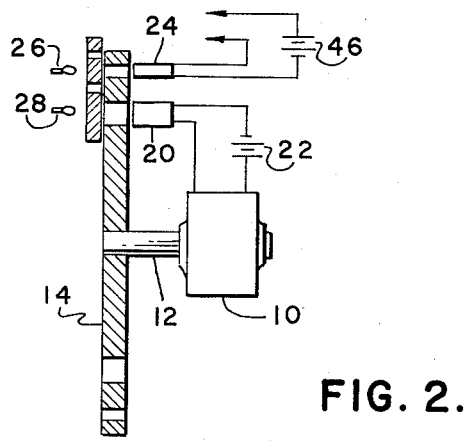

These and further objects and advantages of the invention will become more apparent upon reference to the specification and claims and appended drawings wherein:

Figure 1 is a vertical elevation of a motor constructed according to the present invention; and Figure 2 is a vertical elevation partly in section showing the motor of Figure 1.

Referring more particularly to the figures of the drawing, there is seen a direct current impulse motor 10 having a shaft 12 which carries a disc 14. The impulse motor 10 may be of any conventional type adapted to be stepped around on the application of direct current impulses to its windings and may, for example, consist of a two-pole permanent magnet rotor cooperating with a pair of windings on the stator which are energized to impulse the rotor around.

The disc 14 carries about its periphery an outer circle of equally spaced openings 16 and an inner circle of equally spaced openings 18 concentrically arranged within the outer circle. Mounted behind the inner circle of openings 18 is a first photo-electric cell 20 which is connected to the motor 10 through a suitable source of direct current potential such as battery 22. A second photo-electric cell 24 is mounted behind the outer circle of openings 16. A pair of light sources 26 and 28 are placed in front of the disc opposite the circles of openings 16 and 18 respectively.

A masking plate 30 is mounted between the light sources and the disc 14 and carries a pair of openings 32 and 34 which are adapted to be aligned with the openings 16 and 18 when the plate 30 is properly located. It will be noted that the lower opening 34 is displaced to the left of opening 32 in order to provide speed control in a manner presently to be described. In the position of the plate shown in Figure 1, the openings 32 and 34 in the plate 30 are out of alignment with the openings 16 and 18 in the disc 14 so that no light is transmitted from the light sources 26 and 28 to the photocells 24 and 20.

The masking plate 30 is carried at the right end of a vibrating reed or rod 36 mounted on a suitable torsion bar or other support 38 for vibrating movement. The other end 40 of the reed or rod 36 carries a magnetic member 42 which may be ferro-magnetic or may consist of a permanent magnet. Mounted immediately above the magnetic member 42 is a solenoid 44 which, upon energization, attracts the magnetic member 42. The photocell 24 adjacent the outer row of openings is connected to the solenoid 44 through a suitable direct current source such as a battery 46.

The operation of the device is as follows:

As the masking plate 30 moves up and down the two openings 32 and 34 sweep across the openings 16 and 18 in the disc. At the time that the mechanical vibrator is passing through its equilibrium position in the downward direction in the figures in the drawing, the upper opening 32 comes into alignment with the outer row of openings 16. On the return or upward oscillation of the masking plate 30, the opening 32 passes between openings 16, so that no light can be transmitted through the disc 14.

At the time when the opening 32 is opposite one of the openings 16 in the disc 14, light from source 26 passes through the two holes or openings to strike the photocell 24. This photocell controls current from the battery 46 which provides energy to the electromagnet or solenoid 44 to maintain oscillation of the mechanical vibrator 36. This energy is supplied as the vibrating element passes through its equilibrium position so that the introduction of the energy has no net disturbing effect on the frequency of vibration.

The disc 14 is driven by the impulse motor 10 and the constant speed necessary to insure that the electromagnet properly receives its periodic impulses is provided by a cooperation between the opening 34 in the masking plate 30 and the circle of openings 18 in the disc. When the opening 34 is opposite an opening 18 in the disc, light passes from the light source 28 to the photo-cell 20 which feeds energy from the battery 22 to the motor 10. Assuming that the disc is rotating in a clockwise direction, the amount of light passing through the openings 32 and 18 during the time that they are aligned is determined by the position of the opening 18 at that moment. The system is so designed that the energy supplied at perfect alignment of the openings is just enough to maintain correct motor speed. Obviously, if the disc is slightly ahead of schedule or synchronism with the opening 18 farther to the right than depicted in Figure 1, the energy supplied to the motor will be slightly less. If the disc is slightly behind schedule, the energy supplied is increased. This is due to the fact that the openings 34 and 18 are slightly misaligned at the time that the opening 32 and the opening 16 are in exact alignment. The opening 32 in the masking plate 30 is smaller than the openings 16, which are elongated so that the vibrating element receives the same energization when the disc is running fast or slow.

It will be obvious that other variations may be made to adjust for expected operating conditions. As an example, the openings 16 may be formed in a slightly wedged shape, so that if the disc runs consistently slow because of a drop in battery voltage, slightly more light reaches the photo-cell 24 to maintain normal reed amplitude of vibration at the reduce voltage. Similarly, openings 34 and 18 may be given special shapes to control the relationship between lead or lag of the disc and the energy supplied to the motor. The openings may be replaced with transparent areas, it only being necessary that they have a higher energy "transmittability" than surrounding areas of the disc.

A number of further variations are possible. The photo-cells may be of the self-generating type or, as shown, may be of the type wherein the light causes a variation in resistance. An amplifier may be utilized in the circuit from either photo-cell. Lenses or mirrors may be used to focus the light at the opening and through the use of a suitable optical system, a single light source may be relied upon. The light source itself may be replaced by a heat source or a radioactive source of energy with any suitable energy detector utilized in place of the photo-cells. The source of energy, particularly where a radioactive material is used, may be mounted on or in the masking plate 30 so that it simply sweeps past the openings in the disc. It would also be possible to eliminate the openings 34 and 18 using the openings 32 and 16 to drive both the reed and the motor. The mechanical vibrator may be of any type and preferably would be spring mounted without bearings. In a specific instance, the frequency of vibration of the mechanical vibrator may be 60 vibrations per second and the disc speed may be 60 r.p.m. The motor 10 may be of any direct current or alternating current type including a salient pole synchronous type where self-starting is not required.

The accuracy obtained from the system is determined only by the accuracy of the vibrating element and this may be utilized to provide a high precision of control. The speed is sufficiently constant to permit driving a timekeeping device.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and described to be secured by United States Letters Patent is:

1. A motor system comprising a motor, a plate member driven by said motor, a source of energy radiation opposite one side of said plate member, said plate member having portions thereof having different abilities to transmit said radiation, some of said portions transmitting said radiation better than other portions, vibrating means, means controlled by said vibrating means for periodically permitting said radiation to reach said portions of said plate member of better energy transmittability, and pickup means opposite the other side of said plate member sensitive to radiation passing through said portions of said plate member of better transmittability for controlling the energization of said vibrating means and said motor.

2. A motor system as set out in claim 1 wherein said plate member has a pair of concentric circularly disposed portions having better transmittability, and said pick-up means opposite the other side of said plate member comprises a pair of pick-up means sensitive to radiation, one said pick-up means controlling the energization of said vibrating means and the other pick-up means controlling the energization of said motor.

3. A motor system as set out in claim 2 wherein said vibrating means is electromagnetically driven.

4. A motor system as set out in claim 1 wherein said means for permitting said radiation to reach said portions of said plate member of better transmittability comprises a masking member itself having portions of better energy transmittability than other portions, said means being between said source of energy radiation and said pick-up means.

5. A motor system as set out in claim 4 wherein said plate member has a pair of concentric circularly disposed portions having better transmittability, and said pick-up means opposite the other side of said plate member comprises a pair of pick-up means sensitive to radiation, one said pick-up means controlling the energization of said vibrating means and the other pick-up means controlling the energization of said motor, and said masking member has a pair of portions of better transmittability simultaneously alignable with said concentrically disposed portions.

6. A motor system as set out in claim 5 wherein said portions of better transmittability controlling the amount of energy reaching said first pick-up means are so arranged that the amount of energy reaching said first pick-up means is independent of the speed of said plate member.

7. A motor system as set out in claim 6 wherein said portions of better transmittability controlling the amount of energy reaching said second pick-up means are so arranged that the amount of energy reaching said second pick-up means increases when the speed of said plate member decreases and decreases when the speed of said plate member increases.

8. A motor system as set out in claim 7 wherein said source of energy radiation is a light source and said pick-up means are photocells.

9. A motor system as set out in claim 8 wherein said vibrating means comprises a centrally mounted elongated member carrying said masking member at one end thereof.

10. A motor system as set out in claim 9 wherein said elongated vibrating member carries a magnetic means at the other end thereof.

References Cited in the file of this patent

FOREIGN PATENTS 631,118     France _____ Mar. 16, 1955
          (Addition to No. 981,246)